United States Patent
Singh et al.

(10) Patent No.: US 11,645,659 B2
(45) Date of Patent: May 9, 2023

(54) FACILITATING CUSTOMERS TO DEFINE POLICIES FOR THEIR CLOUDS

(71) Applicant: Nutanix, Inc., San Jose, CA (US)

(72) Inventors: Amarkant Singh, Bangalore (IN); Karthik Konduri, Hyderabad (IN)

(73) Assignee: NUTANIX, INC., San Jose, CA (US)

( * ) Notice: Subject to any disclaimer, the term of this patent is extended or adjusted under 35 U.S.C. 154(b) by 0 days.

(21) Appl. No.: 16/600,601

(22) Filed: Oct. 14, 2019

(65) Prior Publication Data

US 2021/0035112 A1 Feb. 4, 2021

(30) Foreign Application Priority Data

Jul. 31, 2019 (IN) .............................. 201941030949

(51) Int. Cl.
*G06F 15/173* (2006.01)
*G06Q 30/01* (2023.01)
*G06N 20/00* (2019.01)

(52) U.S. Cl.
CPC ............. *G06Q 30/01* (2013.01); *G06N 20/00* (2019.01)

(58) Field of Classification Search
CPC .............................. G06Q 30/01; G06N 20/00
USPC .......... 709/226; 707/718, 694, 719; 705/302
See application file for complete search history.

(56) References Cited

U.S. PATENT DOCUMENTS

| | | | |
|---|---|---|---|
| 7,882,501 B1 * | 2/2011 | Carlson ................... | G06F 8/656 709/221 |
| 8,549,518 B1 | 10/2013 | Aron et al. | |
| 8,601,473 B1 | 12/2013 | Aron et al. | |
| 8,812,520 B1 * | 8/2014 | Sandler ............... | G06F 16/9024 707/748 |
| 8,850,130 B1 | 9/2014 | Aron et al. | |
| 9,319,286 B2 | 4/2016 | Panuganty | |
| 9,692,789 B2 | 6/2017 | Kirti et al. | |
| 9,749,311 B2 | 8/2017 | Jayanti Venkata et al. | |
| 9,772,866 B1 | 9/2017 | Aron et al. | |
| 10,469,327 B1 * | 11/2019 | Velmurugan ....... | H04L 41/0853 |
| 10,824,959 B1 * | 11/2020 | Chatterjee .............. | G06N 7/005 |

(Continued)

OTHER PUBLICATIONS

Managing Compliance in Multi Cloud Environment,https://www.corestack.io/wp-content/uploads/2017/09/managing-compliance-in-multi-cloud-environment.pdf, downloaded circa Jan. 24, 2019, 7 pages.

(Continued)

*Primary Examiner* — Thuong Nguyen
(74) *Attorney, Agent, or Firm* — IPHorizons PLLC; Narendra Reddy Thappeta

(57) ABSTRACT

An aspect of the present disclosure facilitates customers to define policies for their clouds. In one embodiment, a policy data specifying respective policies defined by customers in their corresponding clouds is maintained. Upon receiving deployment details of a cloud (e.g., their cloud) from a customer, a set of policies of potential interest to the customer is determined based on the deployment details of the cloud and the policy data. The determined set of policies is then recommended to the customer for definition in the/their cloud. According to another aspect of the present disclosure, a machine learning (ML) model is generated based on a policy data specifying respective policies defined by customers in their corresponding clouds. As such, a set of policies of potential interest to a customer is predicted based on the ML model.

21 Claims, 10 Drawing Sheets

(56) References Cited

U.S. PATENT DOCUMENTS

| | | | | |
|---|---|---|---|---|
| 2006/0265689 | A1* | 11/2006 | Kuznetsov | G06F 9/546 717/117 |
| 2009/0076887 | A1* | 3/2009 | Spivack | G06Q 30/0273 705/14.69 |
| 2009/0119095 | A1* | 5/2009 | Beggelman | G06F 40/30 704/9 |
| 2009/0276722 | A1* | 11/2009 | Segel | G06F 16/48 715/765 |
| 2011/0231817 | A1* | 9/2011 | Hadar | G06Q 30/06 717/120 |
| 2011/0295999 | A1* | 12/2011 | Ferris | G06F 9/5072 709/224 |
| 2012/0030248 | A1* | 2/2012 | Blinnikka | G06F 16/9574 707/E17.044 |
| 2012/0042055 | A1* | 2/2012 | Agarwala | G06F 9/5061 709/220 |
| 2012/0072985 | A1* | 3/2012 | Davne | H04L 63/20 726/22 |
| 2012/0197751 | A1* | 8/2012 | Zatkin | G06F 16/2465 705/26.7 |
| 2012/0239739 | A1* | 9/2012 | Manglik | G06F 9/5077 709/203 |
| 2014/0025608 | A1* | 1/2014 | Miller | G06Q 10/10 706/12 |
| 2014/0173112 | A1* | 6/2014 | Seago | H04L 67/32 709/226 |
| 2014/0325016 | A1* | 10/2014 | Chen | H04L 67/306 709/217 |
| 2015/0278241 | A1* | 10/2015 | Bates-Haus | G06F 16/215 707/692 |
| 2015/0304231 | A1* | 10/2015 | Gupte | G06F 9/5072 709/226 |
| 2016/0004775 | A1* | 1/2016 | Aleskerov | G06F 16/951 707/749 |
| 2016/0062607 | A1* | 3/2016 | Lunceford | G06F 3/04886 715/845 |
| 2016/0070803 | A1* | 3/2016 | Nuckolls | G06F 16/3347 707/730 |
| 2016/0119357 | A1* | 4/2016 | Kinsella | H04L 63/102 726/1 |
| 2016/0162909 | A1* | 6/2016 | Akolkar | G06Q 30/0202 705/7.29 |
| 2016/0254957 | A1 | 9/2016 | Maes | |
| 2016/0378558 | A1* | 12/2016 | LaMantia | H04L 67/42 718/103 |
| 2017/0010874 | A1* | 1/2017 | Rosset | H04L 67/34 |
| 2017/0090760 | A1* | 3/2017 | Kalipatnapu | G06F 3/0653 |
| 2017/0126523 | A1 | 5/2017 | Chen et al. | |
| 2017/0295197 | A1 | 10/2017 | Parimi et al. | |
| 2018/0048935 | A1* | 2/2018 | Ashoori | H04N 21/251 |
| 2018/0234459 | A1 | 8/2018 | Kung et al. | |
| 2018/0357431 | A1* | 12/2018 | Ellingson | H04W 12/033 |
| 2019/0080063 | A1* | 3/2019 | Rice | G06F 21/6245 |
| 2019/0155797 | A1* | 5/2019 | Nath | G06F 16/122 |
| 2019/0195852 | A1* | 6/2019 | Bryant, Jr. | G01N 33/15 |
| 2019/0207985 | A1* | 7/2019 | Yuan | H04L 63/102 |
| 2019/0236460 | A1* | 8/2019 | Jagota | G06N 5/025 |
| 2019/0236485 | A1* | 8/2019 | Stanley, III | G06N 3/006 |
| 2020/0151616 | A1* | 5/2020 | Mermoud | G06N 5/003 |
| 2020/0404051 | A1* | 12/2020 | Guniguntala | H04L 41/5009 |

OTHER PUBLICATIONS

Corestack, Managing Multi-Cloud Security, https://www.corestack.io/blog/managing-multi-cloud-security, Apr. 19, 2017, 4 pages.

Corestack, Enforcing governance for virtual machines the CoreStack way, https://www.corestack.io/blog/enforcing-governance-virtual-machines-corestack-way/, Mar. 28, 2018, 4 pages.

CAMS—A leading Financial services company reduces cloud costs by 60% using CoreStack platform, downloaded circa Jan. 24, 2019, 3 pages.

TrueSight Cloud Security—BMC Softwar, https://www.bmc.com/it-solutions/truesight-cloud-security.html, downloaded circa Jan. 23, 2019, 9 pages.

BMC Software, Inc., TrueSight Cloud Security Automated cloud and container security and compliance at scale, Datasheet, http://documents.bmc.com/products/documents/61/00/506100/506100.pdf, downloaded circa Jan. 23, 2019, 2 pages.

Multi-Cloud Monitoring, https://www.uila.com/solutions/muiti-cloud-monitoring, downloaded circa Jan. 23, 2019, 6 pages.

CloudBots, https://cloudbots.readthedocs.io/en/latest/, downloaded circa Jan. 21, 2019, 14 pages.

Ignacio Cano, et al., Curator: Self-Managing Storage for Enterprise Clusters, https://www.usenix.org/conference/nsdi17, Mar. 27-29, 2017, 16 pages, Boston, MA, Nutanix Inc.

Steven Poitras, The Nutanix Bible, https://nutanixbible.com/#anchor-book-of-basics, Sep. 17, 2019, 434 pages, Nutanix Inc.

Poitras, Steven. "The Nutanix Bible" (Oct. 15, 2013), from http://stevenpoitras.com/the-nutanix-bible/ (Publication date based on indicated capture date by Archive.org; first publication date unknown); pp. all.

Poitras, Steven. "The Nutanix Bible" (Jan. 11, 2014), from http://stevenpoitras.com/the-nutanix-bible/ (Publication date based on indicated capture date by Archive.org; first publication date unknown); pp. all.

Poitras, Steven. "The Nutanix Bible" (Jun. 20, 2014), from http://stevenpoitras.com/the-nutanix-bible/ (Publication date based on indicated capture date by Archive.org; first publication date unknown); pp. all.

Poitras, Steven. "The Nutanix Bible" (Jan. 7, 2015), from http://stevenpoitras.com/the-nutanix-bible/ (Publication date based on indicated capture date by Archive.org; first publication date unknown); pp. all.

Poitras, Steven. "The Nutanix Bible" (Jun. 9, 2015), from http://stevenpoitras.com/the-nutanix-bibie/ (Publication date based on indicated capture date by Archive.org; first publication date unknown); pp. all.

Poitras, Steven. "The Nutanix Bible" (Sep. 4, 2015), from https://nutanixbible.com/ pp. all.

Poitras, Steven. "The Nutanix Bible" (Jan. 12, 2016), from https://nutanixbible.com/ pp. all.

Poitras, Steven. "The Nutanix Bible" (Jun. 9, 2016), from https://nutanixbible.com/ pp. all.

Poitras, Steven. "The Nutanix Bible" (Jan. 3, 2017), from https://nutanixbible.com/ pp. all.

Poitras, Steven. "The Nutanix Bible" (Jun. 8, 2017), from https://nutanixbible.com/ pp. all.

Poitras, Steven. "The Nutanix Bible" (Jan. 3, 2018), from https://nutanixbible.com/ pp. all.

Poitras, Steven. "The Nutanix Bible" (Jun. 25, 2018), from https://nutanixbible.com/ pp. all.

Poitras, Steven. "The Nutanix Bible" (Jan. 8, 2019), from https://nulanixbible.com/ pp. all.

Poitras, Steven. "The Nutanix Bible" (Jul. 25, 2019), from https://nutanixbible.com/ pp. all.

Peter Harrington, "Machine Learning in Action", ISBN No. 9781617290183 and published on 2012.

Jun Wang et al. "Unifying User-based and Item-based Collaborative Filtering Approaches by Similarity Fusion", Information and Communication Theory Group; Faculty of Electrical Engineering, Mathematics and Computer Science, Delft University of Technology, The Netherlands, Published on Aug. 6-11, 2006.

Introduction to Azure Blob storage, https://docs.microsoft.com/en-us/azure/storage/blobs/storage-blobs-introduction, May 24, 2019, 04 Pages.

S.Balaji, K.Rajkumar, A Personalized Cloud Service Recommendation System Using Collaborative Filtering, International Journal of Pure and Applied Mathematics, 2018, vol. 119 No. 12, pp. 14173-14180.

Defining and Managing Cloud Policies, https://docs.oracle.com/cd/E24628_01/doc.121/e28814/cloud_policies.htm#EMCLO300, Apr. 24, 2013, 08 pages.

(56) References Cited

OTHER PUBLICATIONS

Carbon Black Cloud: How to Configure Policy Rules, https://community.carbonblack.com/t5/Knowledge-Base/Carbon-Black-Cloud-How-to-Configure-Policy-Rules/ta-p/48383, Sep. 17, 2018, 04 Pages.

AWS Identity and Access Management, https://docs.aws.amazon.com/IAM/latest/UserGuide/iam-ug.pdf, Nov. 5, 2013, 852 pages.

MobileIron Cloud Help, http://mi.extendedhelp.anyware.com/en/desktop/Welcome.htm, Aug. 11, 2017, 02 Pages.

MobileIron Cloud Help-Policies, http://mi.extendedhelp.anyware.com/en/desktop/Policies.htm, Jan. 20, 2016, 04 Pages.

NetApp Active IQ—Top 5 Reasons to Use Active IQ Now, https://blog.netapp.com/top-5-reasons-to-use-active-iq-now/, Feb. 28, 2018, 04 Pages.

NetApp Active IQ: Solving Today's Problems and Uncovering Tomorrow's Opportunities, https://blog.netapp.com/netapp-active-iq-solving-todays-problems-and-uncovering-tomorrows-opportunities/, Mar. 25, 2019, 01 Page.

NetApp Active IQ Telemetry and UI Feature Security, https://www.netapp.com/pdf.html?item=/media/17080-tr4699pdf.pdf. May 2018, 08 Pages.

\* cited by examiner

Policy Definition 410

| | User Id | Cloud Id | Policy Id | Description | Scope | Trigger | Condition | Action |
|---|---|---|---|---|---|---|---|---|
| 421 → | 1001 | C100 | 2201 | Ensure that the data at rest is encrypted | All Storage.ObjectStore | Event Create/ Modify | Encryption is not enabled | Set encryption enabled; Notify by email |
| 422 → | 1023 | C241 | 2111 | Ensure no network misconfiguration of VMs to avoid network threats | network.Config of VMs with(tagKey='deployment'&& tagValue!=public) | Event Launch VM Instance | IP address is not in local address range | Block public access; Notify by email |
| 423 → | 1085 | C304 | 2350 | Ensure that the user keys are periodically rotated | IAM.User | Periodic System Scan | accessKey aged <= 60 days | Create new access key; Delete old access key; notify by slack |
| 424 → | 1092 | C521 | 2501 | Ensure all the VMs should have a name defined | compute.VM | Event Launch/ Modify VM | tagKey[] has 'name' and tagValue[name] isNotEmpty | create a ticket; notify by email |
| 425 → | 1125 | C550 | 2652 | Ensure Development team cannot launch a VM above a predefined capacity | compute.VM of VMs with(accountName='*dev*') | Event Launch/ Modify VM | compute.VM.core<=4 | VM shutdown; notify by email; notify by slack |
| | : | : | : | : | : | : | : | : |
| | : | : | : | : | : | : | : | : |

*FIG. 4A*

AWS Policy

| Policy Id | Scope | Trigger | Condition | Action |
|---|---|---|---|---|
| 2201 | AWS.S3, All AWS Accounts, All AWS locations, All tags | ?aws.s3.CreateBucket, aws.s3.ModifyBucket | ?(is s3.encryptionEnabled = false) | SET PARAM {"AttributeName" : "aws.s3.encryptionEnabled", "AttributeValue" : true, "EncryptionType" : "AES-256"} AND SEND NOTIFICATION {"NotificationType" : "Email", "Recipients" : "kanha@nx.com"} |
| 2111 | AWS.EC2, All AWS Accounts, All AWS locations, (TagKey=Deployment AND TagValue !=Public) | aws.ec2.LaunchInstance, aws.ec2.ModifyInstance, aws.ec2.subnet.Modify | (is ec2.subnet.inboudRules.IPRange = 0.0.0.0/*) or (is ec2.subnet.inboudRules.IPRange not in (10.0.0.0, 10.255.255.255) and is ec2.subnet.inboudRules.IPRange not in (172.16.0.0, 172.31.255.255) and is ec2.subnet.inboudRules.IPRange not in (192.168.0.0, 192.168.255.255)) | EXECUTE {"actionName" : "aws.ec2.detachSG", "actionParam" : ["<security-group-id>", "instance-id"]} AND SEND NOTIFICATION {"NotificationType" : "Email", "Recipients" : "? kanha@nx.com?"} |
| ... | ... | ... | ... | ... |
| ... | ... | ... | ... | ... |

*FIG. 4B*

Azure Policy — 470

| Policy Id | Scope | Trigger | Condition | Action |
|---|---|---|---|---|
| 2201 | Azure.BlobStore, All Azure Accounts, All Azure locations, All tags<br><br>Here AWS.S3 and Azure.BlobStore is the name of the service | ?azure.blob.CreateBlobStore, azure.blob.ModifyBlobStore<br><br>These are events that our event listener listens to. | ?(is blob.encryptionEnabled = false) | ?SET PARAM {"AttributeName" : "azure.blob.encryptionEnabled", "AttributeValue" : true, "EncryptionType" : "AES-256"} AND SEND NOTIFICATION {"NotificationType" : "Email", "Recipients" : "? kanha@nx.com?"} |
| 2111 | Azure.VMs, All Azure Accounts, All Azure locations, (TagKey=Deployment AND TagValue !=Public) | azure.vm.LaunchVM, azure.vm.ModifyVM, azure.nsg.ModifyConfig<br><br>These are events that our event listener listens to. | (is azure.nsg.inboudRules.IPRange = 0.0.0.0/*) or (is azure.nsg.inboudRules.IPRange not in (10.0.0.0, 10.255.255.255) and is azure.nsg.inboudRules.IPRange not in (172.16.0.0, 172.31.255.255) and is azure.nsg.inboudRules.IPRange not | ?EXECUTE {"actionName" : "azure.vm.detachNSG", "actionParam" : ["<network-security-group-id>", "vm-id"]} AND SEND NOTIFICATION {"NotificationType" : "Email", "Recipients" : "? kanha@nx.com?"} |
| ... | ... | ... | ... | ... |
| ... | ... | ... | ... | ... |

481 → (row 2201)
482 → (row 2111)

*FIG. 4C*

FACILITATING CUSTOMERS TO DEFINE POLICIES FOR THEIR CLOUDS

PRIORITY CLAIM

The instant patent application is related to and claims priority from the co-pending India provisional patent application entitled, "EVENT DRIVEN COMPLIANCE REMEDIATION ENGINE", Serial No.: 201941030949, Filed: 31 Jul. 2019, which is incorporated in its entirety herewith.

BACKGROUND OF THE DISCLOSURE

Technical Field

The present disclosure relates to cloud computing, and more specifically to facilitating customers to define policies for their clouds.

Related Art

Cloud infrastructure refers to a collection of processing nodes, connectivity infrastructure, data storages, etc., which can be engineered to together provide a respective virtual infrastructure for various customers, with the scale of each such virtual infrastructure being specified often on demand.

Cloud refers to the virtual infrastructure thus provided for a specific customer/tenant. The virtual infrastructure contains computing resources (e.g., virtual machines, operating systems) and storage resources (e.g., database servers, file systems). Each tenant may host desired applications/data services on the resources provided as a part of their cloud(s), with the services being capable of processing user requests received from end user systems. Many vendors such as Amazon, Google, Microsoft, etc., have corresponding public cloud infrastructures based on which clouds are provided for respective customers/tenants.

Customers are often required to define policies associated with their clouds. Each policy specifies corresponding constraints that are to be enforced in the management and operation of the computing and storage resources of the cloud. The term define implies that a customer has specified the corresponding policy to be applied and accordingly the defined policies are being enforced. The policies are directed to aspects such as financial management, cost optimization, performance management, network security, compliance and cloud governance.

Aspects of the present disclosure are directed to facilitating customers to define policies for their clouds.

BRIEF DESCRIPTION OF THE DRAWINGS

Example embodiments of the present disclosure will be described with reference to the accompanying drawings briefly described below.

FIGS. 4A-4C depicts portions of policy data used in clouds in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

Figure 1A:
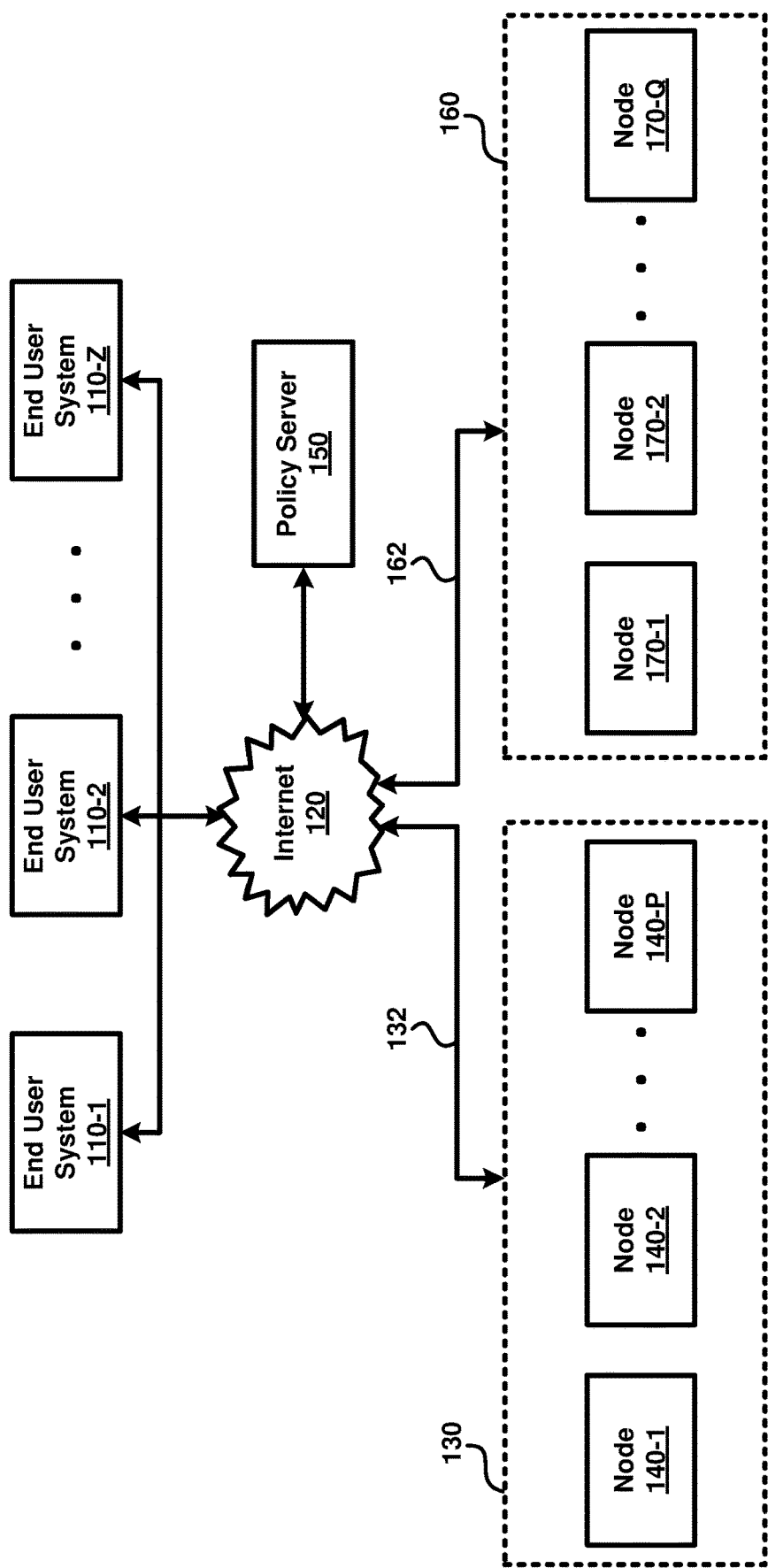
FIG. 1A is a block diagram illustrating an example environment (computing system) in which several aspects of the present invention can be implemented.

An aspect of the present disclosure facilitates customers to define policies for their clouds. In one embodiment, a policy data indicating respective policies defined by customers in their corresponding clouds is maintained. Upon receiving deployment details of a cloud sought to be managed (e.g., their cloud) from a customer, a set of policies of potential interest to the customer is determined based on the deployment details of the cloud and the policy data. The determined set of policies is then recommended to the customer for definition in the/their cloud.

According to another aspect of the present disclosure, a machine learning (ML) model is generated based on a policy data specifying respective policies defined by customers in their corresponding clouds. As such, a set of policies of potential interest to a customer is predicted based on the ML model.

In one embodiment, each policy is of the form of a rule set and a corresponding action set, wherein the rule set specifies one or more conditions and the corresponding action set specifies one or more actions to be performed when the conditions are satisfied in a cloud.

According to one more aspect of the present disclosure, predicting of policies of potential interest to a customer is performed by identifying an initial rule set for the customer based on the deployment details of their cloud. A set of rule sets closest to the initial rule set is then found based on an ML model. A set of action sets having the corresponding action set of each of the found set of rule sets is then formed. A subset of action sets that are most suitable for the initial rule set is then selected based on a (same/another) ML model. Accordingly, each of the subset of action sets and the corresponding rule set is included as a corresponding policy in the set of policies of potential interest to the customer.

In one embodiment, the initial rule set is received from the customer as part of said receiving. In another embodiment, a score for each action set in the formed set of actions sets is calculated, and the subset of actions sets is selected based on said score.

According to yet another aspect of the present disclosure, the finding of the set of rule sets closest to the initial rule set is performed using regression similarity learning in the ML model, while the selecting of the subset of action sets is performed using collaborative filtering in the ML model.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

FIG. 1A is a block diagram illustrating an example environment (computing system) in which several aspects of the present invention can be implemented. The block diagram is shown containing end user systems 110-1 through 110-Z (Z representing any natural number), internet 120, policy server 150 and cloud infrastructures 130 and 160. Cloud infrastructure 130 in turn is shown containing nodes 140-1 through 140-P (P representing any natural number), while cloud infrastructure 160 in turn is shown containing nodes 170-1 through 170-Q (Q representing any natural number). The end user systems and nodes are collectively referred to by 110, 140 and 170 respectively.

Merely for illustration, only representative number/type of systems is shown in FIG. 1A. Many environments often contain many more systems, both in number and type, depending on the purpose for which the environment is designed. Each block of FIG. 1A is described below in further detail.

Each of cloud infrastructures 130 and 160 is a collection of processing nodes (140 and 170), connectivity infrastructure, data storages, administration systems, etc., which are engineered to together provide a virtual computing infrastructure for various customers, with the scale of such computing infrastructure being specified often on demand. Cloud infrastructures 130/160 may be one of Amazon Web Services (AWS) Cloud available from Amazon.com, Inc., Google Cloud Platform (GCP) available from Google LLC, Azure cloud available from Microsoft, Inc., etc., or a private cloud such as an On-Premises cloud owned by the customers/tenants.

All the systems (e.g., 140, 170) of each cloud infrastructure (130/160) are assumed to be connected via an intranet. Internet 120 extends the connectivity of these (and other systems of the cloud infrastructure) with external systems such as end user systems 110 and policy server 150. Each of intranet and Internet 120 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by Internet 120 and intranet 140. When the packet contains content such as port numbers, which specifies a target application, the packet may be said to be directed to such application as well.

Each of user-systems 110 represents a system such as a personal computer, workstation, mobile device, computing tablet etc., used by users to generate (user) requests directed to enterprise applications executing in cloud infrastructures 130 and 160. The user requests may be generated using appropriate user interfaces (e.g., web pages provided by an enterprise application executing in a node, a native user interface provided by a portion of an enterprise application downloaded from a node, etc.).

In general, an end user system requests an enterprise application for performing desired tasks and receives the corresponding responses (e.g., web pages) containing the results of performance of the requested tasks. The web pages/responses may then be presented to the user by user applications such as the browser. Each user request is sent in the form of an IP packet directed to the desired system or enterprise application, with the IP packet including data identifying the desired tasks in the payload portion.

Some of nodes 140 and 170 may be implemented as corresponding data stores. Each data store represents a non-volatile (persistent) storage facilitating storage and retrieval of enterprise by applications executing in the other systems/nodes of cloud infrastructure 130 and 160. Each data store may be implemented as a corresponding database server using relational database technologies and accordingly provide storage and retrieval of data using structured queries such as SQL (Structured Query Language). Alternatively, each data store may be implemented as a corresponding file server providing storage and retrieval of data in the form of files organized as one or more directories, as is well known in the relevant arts.

Some of the nodes 140 and 170 may be implemented as corresponding server systems. Each server system represents a server, such as a web/application server, executing enterprise applications capable of performing tasks requested by users using end user systems 110. A server system receives a client request from an end user system and performs the tasks requested in the user request. A server system may use data stored internally (for example, in a non-volatile storage/hard disk within the server system), external data (e.g., maintained in a data store) and/or data received from external sources (e.g., from the user) in performing the requested tasks. The server system then sends the result of performance of the tasks to the requesting end user system (one of 110) as a corresponding response to the user request. The results may be accompanied by specific user interfaces (e.g., web pages) for displaying the results to the requesting user.

In one embodiment, each customer/tenant is provided with a corresponding virtual computing infrastructure (referred to as a "cloud") hosted on the nodes of cloud infrastructures 130 and 160. Each tenant may host desired applications/data services on their cloud(s), which are capable of processing user requests received from end user systems 110. The manner in which clouds may be hosted in a cloud infrastructure is described below with examples.

3. Hosting Clouds In a Cloud Infrastructure

In one embodiment, virtual machines (VMs) form the basis for executing various enterprise applications in processing nodes/server systems of cloud infrastructures 130 and 160. As is well known, a virtual machine may be viewed as a container in which enterprise applications are executed. A processing node/server system can host multiple virtual machines, and the virtual machines provide a view of a complete machine (computer system) to the enterprise applications executing in the virtual machine.

Figure 1B:
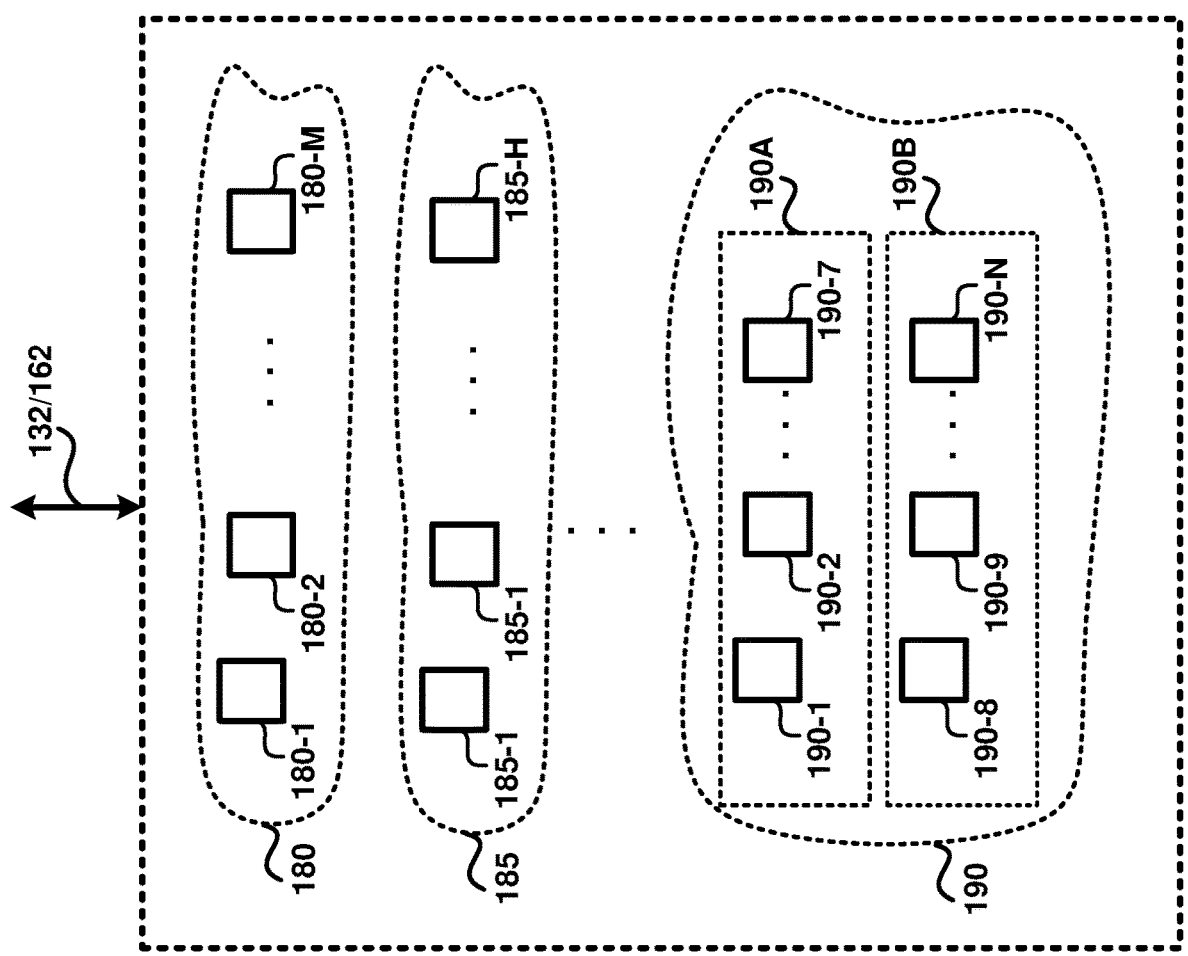
FIG. 1B illustrates the manner in which clouds are hosted in cloud infrastructures in one embodiment.

FIG. 1B illustrates the manner in which clouds are hosted in cloud infrastructures in one embodiment. Specifically, the Figure illustrates the manner in which clouds 180, 185 and 190 are hosted in the nodes of cloud infrastructures 130/160 using VMs. Only a sample set of clouds is shown in FIG. 1B for illustration, though many environments often host a large number (100+) clouds.

Cloud 180 is shown containing VMs 180-1 through 180-M (M representing any natural number) that may be provisioned on the different nodes 140 of cloud infrastructure 130 and/or different nodes 170 of cloud infrastructure 160. Similarly, clouds 185 and 190 are shown respectively containing VMs 185-1 through 185-H and 190-1 through 190-N (H and N representing any natural number).

For illustration, it is assumed that all the VMs in clouds 180 and 185 are provisioned only in nodes 140 and 170 respectively, while the VMs in cloud 190 are assumed to be provisioned in some of nodes 140 and also in some of nodes 170. Cloud 190 may accordingly be viewed as a "hybrid" cloud provisioned across the nodes of multiple cloud infrastructures (130 and 160). Specifically, groups 190A and 190B respectively represents the set of VMs provisioned in cloud infrastructures 130 and 160. It is further assumed that each cloud (180, 185 and 190) is owned by a corresponding customer/tenant.

A customer/tenant owning a cloud may be required to define policies associated with the cloud. The customer may be required to configure a few hundreds of policies related to different aspects (financial management, cost optimization, performance management, network security, compliance and cloud governance, etc.) prior to making the cloud available for processing requests received from end user systems 110. Such a task is both laborious and error prone if done manually by the customer.

Another challenge is when the customer cloud is a hybrid cloud provisioned across multiple cloud infrastructures. Such a hybrid cloud may bring in more complexity in the form of security and compliance. For example, any policy that is applied to a specific cloud infrastructure needs to be duplicated to another cloud infrastructure as well to stay compliant overall.

Policy server 150, provided according to several aspects of the present disclosure, facilitates customers to define policies for their clouds hosted in cloud infrastructures 130/160 while overcoming some of the drawbacks noted above. Though policy server 150 is shown external to cloud infrastructures 130 and 160, in alternative embodiments, policy server 150 may be implemented internal to one of cloud infrastructures 130/160, for example, in one of nodes 140/170. The manner in which policy server 150 facilitates customers to define policies for their clouds is described below with examples.

4. Facilitating Customers to Define Policies for Their Clouds

Figure 2:
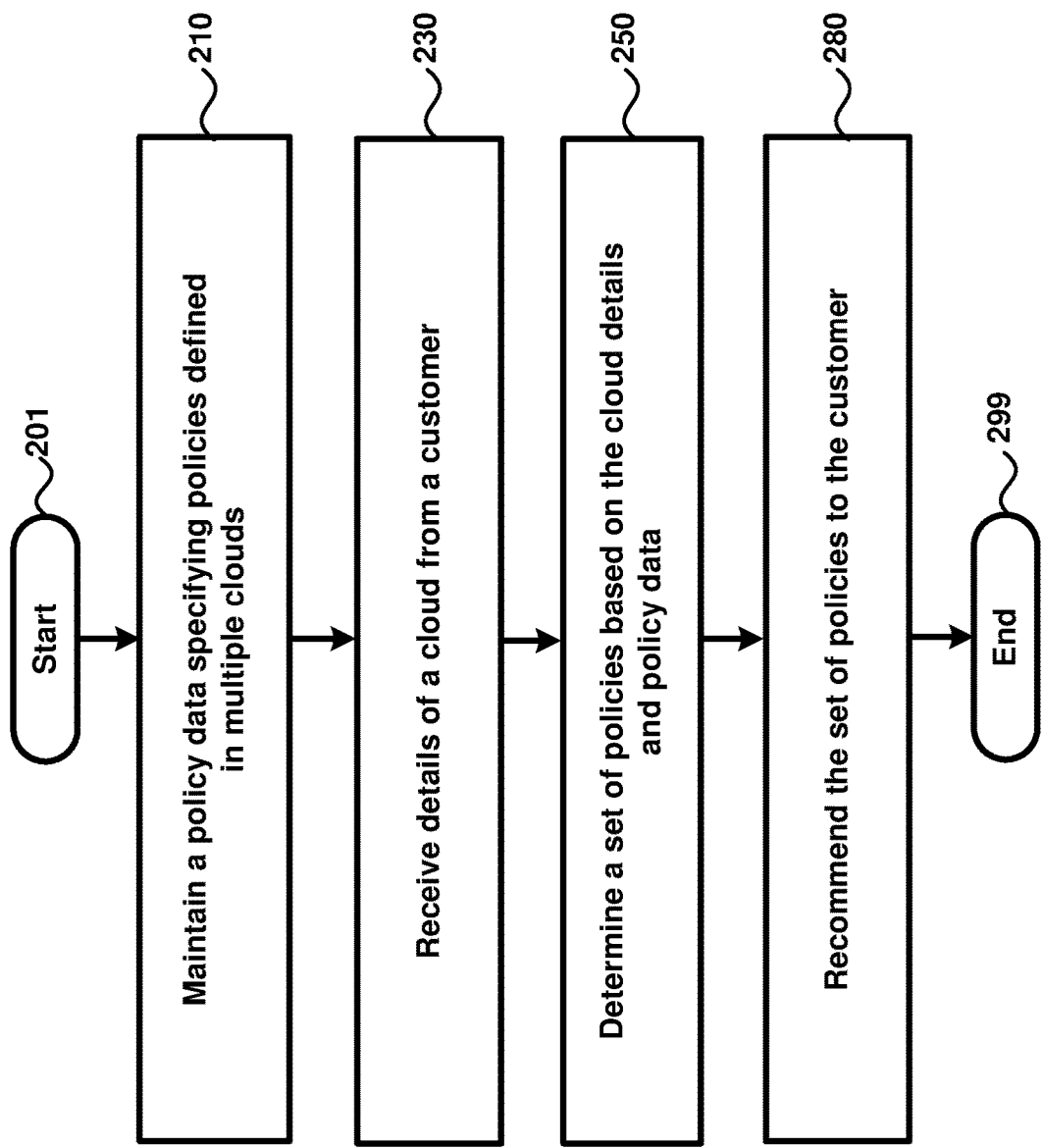
FIG. 2 is a flow chart illustrating the manner in which customers are facilitated to define policies for their clouds according to aspects of the present disclosure.

FIG. 2 is a flow chart illustrating the manner in which customers are facilitated to define policies for their clouds according to aspects of the present disclosure. The flowchart is described with respect to the systems of FIGS. 1A and 1B, in particular policy server 150, merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 220.

In step 220, policy server 150 maintains a policy data specifying policies defined by other customers in multiple clouds (such as clouds 180, 185 and 190) provisioned in one or more cloud infrastructures (such as 130/160). The policy data may be maintained internally (for example, in a hard disk within policy server 150) or in an external data store (not shown in FIGS. 1A/1B) associated with policy server 150.

In step 230, policy server 150 receives deployment details of a cloud from a customer. Deployment details indicate the hardware and software components constituting the cloud (already operational or sought to be provisioned in a cloud infrastructure). The deployment details may include the number and type of VMs contained in the cloud, the details of the nodes/cloud infrastructures provisioning the VMs, the enterprise applications hosted in the VMs, etc. The deployment details may be received from a customer/tenant using one of end user systems 110.

In one embodiment, the deployment details contain secure credentials to access the cloud infrastructures used by the customer for deployment of their cloud. In response, policy server 150 communicates with the cloud infrastructures to retrieve additional deployment details of the customer's cloud. It may be appreciated that such additional deployment details are related to the infrastructure inventory (e.g. those noted above) and associated meta-data available from the cloud infrastructures.

In the following description, it is assumed that the customer is the owner of and wishes to define the policies of his/her already provisioned in cloud 190 of FIG. 1B. Accordingly, policy server 150 receives the deployment details of cloud 190 from the customer.

In step 250, policy server 150 determines a set of policies based on the cloud deployment details and policy data. The determination of the policies may be performed based on the cloud deployment details or learned based on other customer's inputs. For example, if the deployment details indicates that the customer is using AWS ElastiCache for a cluster, policy server 150 includes in the set of policies, a ElastiCache policy that checks that cluster or replication group is enabled and the software Redis 3.2.6, 4.0.10 or later is running on the corresponding cluster (to enable in-transit or at-rest encryption).

According to an aspect of the present disclosure, a machine learning (ML) model is generated based on a policy data specifying respective policies defined by customers in their corresponding clouds. As such, a set of policies of potential interest to a customer is predicted based on the ML model. In the above example, policy server 150 may include the ElastiCache policy in response to the ML model indicating that other customers having similar deployment details (containing one or more ElastiCache clusters) have defined the ElastiCache policy for their corresponding clouds.

In step 280, policy server 150 recommends the set of policies to the customer. For example, policy server 150 may send the set of policies to the end user system used by the customer as a response to receiving the deployment details of the cloud in step 240. The end user system may then display the set of policies to the customer, thereby enabling the customer to select and apply desired ones of the set of policies for his/her cloud. The flow chart ends in step 299.

Thus, by policy server 150 determining and recommending policies of interest to the customers, the task of specifying policies for their clouds (even hybrid clouds) is simplified. The manner in which policy server 150 may be implemented to provide several aspects of the present disclosure according to the steps of FIG. 2 is described below with examples.

5. Example Implementation

Figure 3A:
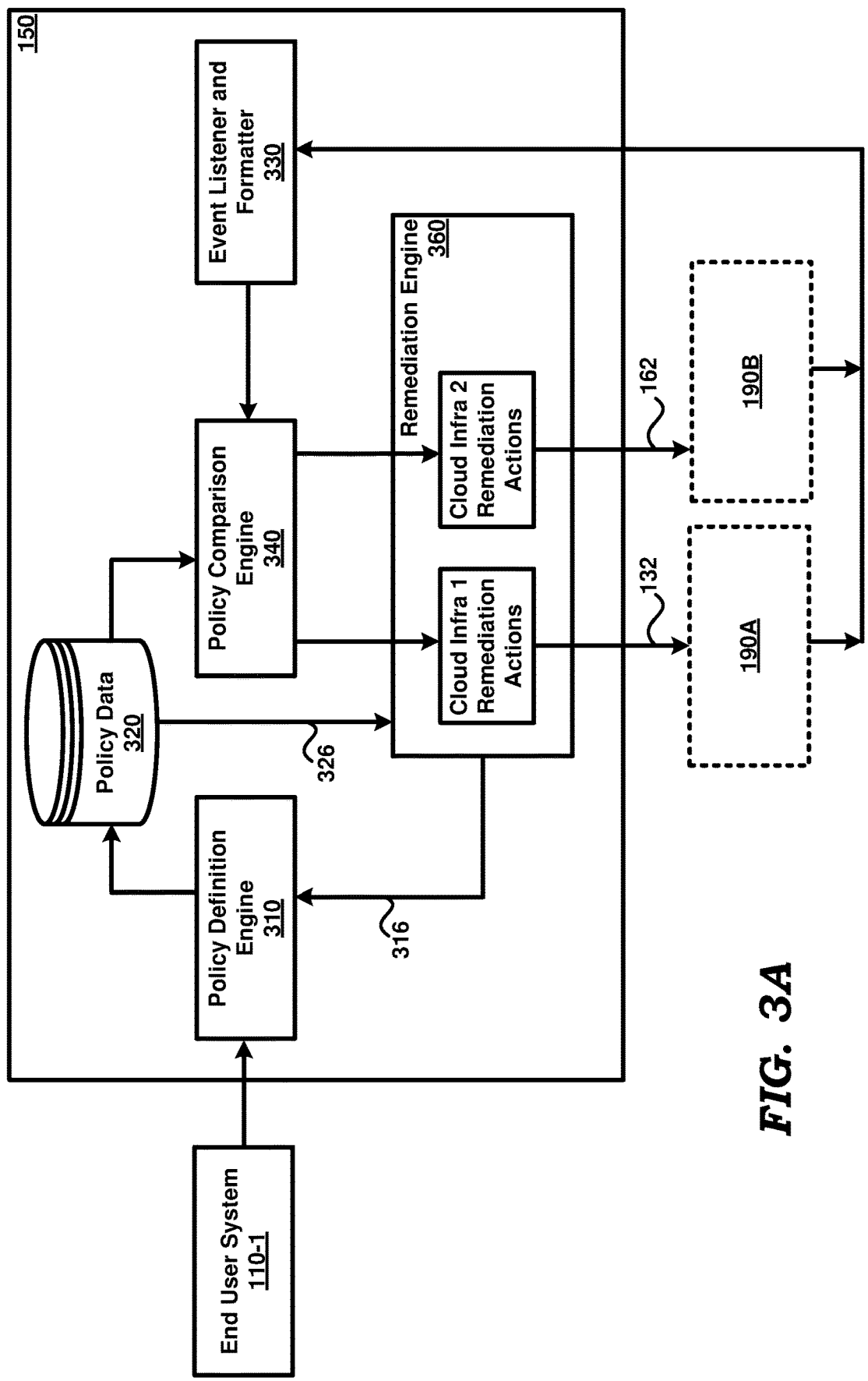
FIGS. 3A and 3B together depicts an example implementation of a policy server in one embodiment.
Figure 3B:
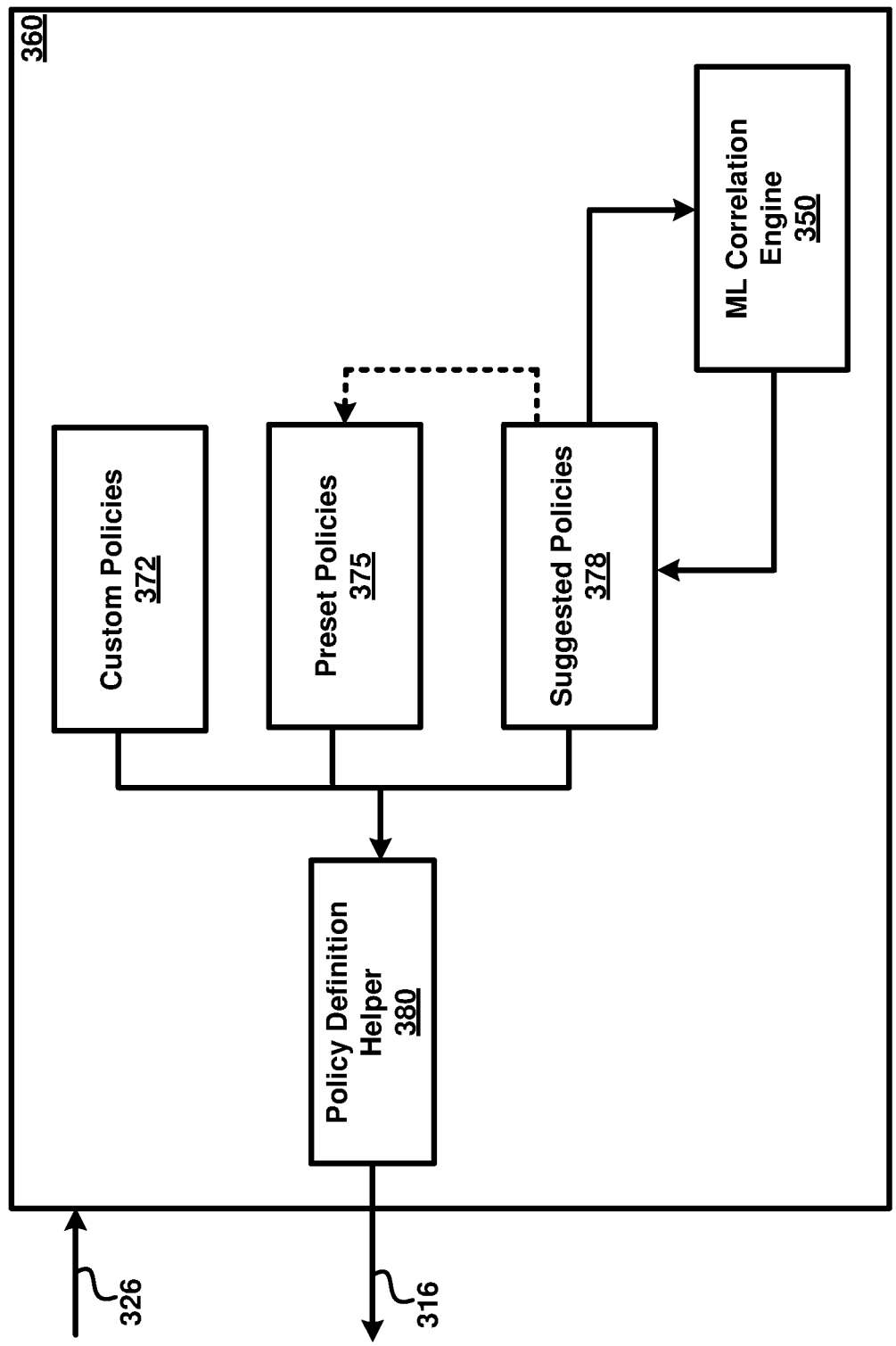

FIGS. 3A and 3B together depicts an example implementation of a policy server in one embodiment. The block diagram of FIG. 3A is shown containing policy definition engine 310, policy data 320, event listener and formatter 330, policy comparison engine 340, remediation engine 360. Each of the blocks of FIG. 3A is described in detail below.

Referring to FIG. 3A, policy definition engine 310 facilitates customers to define policies for their clouds. Specifically, policy definition engine 310 receives an indication from a customer from one of end user systems (assumed to be 110-1 here for illustration), and provides a user interface as a response to the indication. The customer then uses the user interface to specify the deployment details of his/her cloud (e.g., 190) and also specify policies for his/her cloud. Upon the customer submitting the deployment details and/or policies, policy definition engine 310 receives (from end user system 110-1) and stores the customer specified policies as part of policy data 320.

The customer may define policies for aspects such as network security, compliance and cloud governance, financial management/cost optimization, and performance management. Some example policies are shown below:

| | |
|---|---|
| Security and Compliance | Ensure that the data at rest is encrypted - All storage.ObjectStore should have encryption at rest<br>Ensure no network misconfigurations of VMs to avoid network threats - network.Config of VMs with(tagKey='deployment'&& tagValue!=public) should not have open public access<br>Ensure Load balancers are protected by Firewall - All compute.LoadBalancer should have firewall enabled<br>Ensure that the user keys are periodically rotated (say every 60 days) - All IAM.User should have accessKey aged <=60 days.<br>Ensure audit trail logging is enabled - All security.logging is enabled |
| Cloud Governance | Ensure all the VMs should have a name specified - All compute.VM should have tagKey[ ] has 'name' and tagValue[name] isNotEmpty<br>Ensure all the VMs follow a tagging policy (say, tag named 'deployment' and 'owner' is present) - All compute.VM should have (tagKey[ ] has 'deployment' and tagValue[deployment] isNotEmpty) and (tagKey[ ] has 'owner' and tagValue[owner] isNotEmpty)<br>Ensure Development team cannot launch a VM above a pre-specified capacity (say up to 4 cores) - compute.VM of VMs with(accountName='*dev*') should not have core <=4 |
| Financial Management/ Cost Optimization | Ensure that there are no old disk backups (say older than 90 days) - All storage.DiskStore.Backup should have creation_date <=90 days<br>Ensure that there are no unused Public IPs - All network.IP.PublicIP has compute.VM assigned |
| Performance Management | Ensure that no VM is stressed on CPU capacity - All compute.VMs that were running at any time during the last 14 days should not have the daily CPU utilization more than 90% on 4 or more days<br>Ensure that all disks are rightly provisioned for IO operations - All storage.DiskStore should have ProvisionedIOPS configured to at least 90% of the median IOPS value of the past 14 days |

In one embodiment, policy definition engine 310 also converts the customer specified policies to the cloud infrastructure specific policies. Such conversion may entails transforming the policies from a common/generic format to the specific format required for each cloud infrastructure. In the following description, policy definition engine 310 is shown converting the generic policies into AWS specific policies to be applied for the VMs provisioned in the AWS cloud and into Azure specific policies to be applied for the VMs provisioned in the Azure cloud.

Policy data 320 specifies the policies defined by other customers in multiple clouds (such as clouds 180, 185 and 190) provisioned in one or more cloud infrastructures (such as 130/160). In one embodiment, policy data 320 specifies the generic policies and the corresponding cloud infrastructure specific policies. The manner in which policy data may be maintained is described below with examples.

6. Policy Data

FIGS. 4A-4C depicts portions of policy data used in clouds in one embodiment. Though shown in the form of tables, the policy data may be collected/maintained according to other data formats (such as extensible markup language (XML), etc.) and/or using other data structures (such as lists, trees, etc.), as will be apparent to one skilled in the relevant arts by reading the disclosure herein.

Table 410 of FIG. 4A depicts a portion of common/generic policies specified by customers for their clouds. In one embodiment, each policy is of the form of a rule set and a corresponding action set, where the rule set specifies a scope, trigger and a condition, while the corresponding action set specifies an action to be performed when the rule set is satisfied in a cloud. Though each rule set is shown with a single combination of scope, trigger and condition (for illustration), a rule set may contain one or more such combinations in alternative embodiments.

Column "User Id" indicates an identity of the customer specifying the policy, column "Cloud Id" indicates an identity of the cloud (e.g., 180, 185 and 190) owned by the respective customers (and for which the policy is specified), column "Policy Id" indicates a unique identity associated with the policy, and column "Description" indicates a customer understandable description of the policy. Column "Scope" indicates the collection of resources at cloud, account, service, location, tag combination where the corresponding policy is to be applied. Column "Trigger" indicates the event that causes the rule set to be checked. Trigger may be of different types. For example, schedule triggers are time-bound, where the trigger action occurs when the target time is achieved. Event triggers happens when a specified event occurs such as create a bucket in AWS (aws.s3.CreateBucket). Column "Condition" indicates a programmatically verifiable state which can either be true or false.

Column "Action" indicates the corresponding action set to be performed for the policy. The action set may contain multiple actions and may be of different types. Some of the actions may change/update the configuration of the cloud. For example, Set parameters action may set the values of various configuration parameters associated with the VMs and nodes in the cloud. Another type of action may be a send notification, which causes a notification (e.g., email communication, instant message) to be sent using a pre-specified notification channel.

Each of rows 421 and 422 specifies the details of a corresponding policy specified by customers for their clouds. In particular, row 421 specifies the details of the policy "Ensure that the data at rest is encrypted" specified for cloud "C190". Row 421 indicates that the Scope is "All Storage.ObjectStore", the Trigger is "Event Create/Modify", Condition is "Encryption is not enabled" and Action is "Set encryption enabled; Notify by email". Similarly, the other rows of table 410 specify the details of other policies specified by customers for their clouds.

Table 450 of FIG. 4B depicts the AWS specific policies corresponding to the generic policies specified in table 410. The association between the AWS specific and generic policies is based on the value of the Policy Id, with the same value indicating association. Thus, rows 461 and 462 specify the AWS specific policies generated by policy definition engine 310 corresponding to the generic policies specified in rows 421 and 422 respectively.

In particular, row 461 indicates the AWS specific policy corresponding to "Ensure that the data at rest is encrypted". Row 461 indicates that the Scope is "AWS.S3, All AWS Accounts, All AWS locations, All tags", the Trigger is "aws.s3.CreateBucket, aws.s3.ModifyBucket", Condition is "(is s3.encryptionEnabled=false)" and Action is "SET PARAM {"AttributeName": "aws.s3.encryptionEnabled", "AttributeValue": true, "EncryptionType": "AES-256"} AND SEND NOTIFICATION {"NotificationType": "Email", "Recepients": "kanha@nx.com"}". Similarly, the other rows of table 450 specify the details of other AWS specific policies defined by customers for their clouds. Details of the rule sets/action sets that may be specified in AWS is described in various documents available from Amazon Web Services, Inc, for example, in the document entitled "Amazon Simple Storage Service Developer Guide API Version 2006-03-01".

Table 470 of FIG. 4C depicts the Azure specific policies corresponding to the generic policies specified in table 410. Again, the association between the Azure specific and generic policies is based on the value of the Policy Id, with the same value indicating association. Thus, rows 481 and 482 specify the Azure specific policies generated by policy definition engine 310 corresponding to the generic policies specified in rows 421 and 422 respectively. Details of the rule sets/action sets that may be specified in AWS is described in various documents available from Microsoft Corporation, for example, in the document entitled "Introduction to Azure Blob storage" published on May 24, 2019.

Thus, policy server 150 maintains the details of the policies defined by customers for their clouds. The manner in which policy server 150 applies the customer defined policies to their clouds is described below with examples.

7. Applying Policies

Referring again to FIG. 3A, event listener and formatter 330 listens to/receives all the events generated by the clouds owned by the customers, formats the events into specific cloud formatted events and forwards the formatted events to policy comparison engine 340. Policy server 150 may be hooked into cloud infrastructures 130 and 160 for receiving the events generated for the clouds provisioned in the cloud infrastructures, as is well known in the relevant arts. The formatting of the events may entail including details of the cloud infrastructure from which each event is received.

Policy comparison engine 340 receives the formatted events, compares each formatted event with the cloud infrastructure specific policies corresponding to the cloud infrastructure from which the formatted event has been received, and determines whether the formatted event matches any of the combination of Scope, Trigger and Condition in the cloud infrastructure specific policies maintained in policy data 320. If the formatted event does not match any of the policies in policy data 320, policy comparison engine 340 performs no further action for the formatted event and waits for receipt of the next formatted event from event listener and formatter 330.

If a formatted event is determined to have a match with any one of the policies in policy data 320 (that is, a "breach" is determined), policy comparison engine 340 sends the formatted event to remediation engine 360. Specifically, policy comparison engine 340 sends the formatted event and a breach indication (indicating that the event has matched one of rule sets in the policies) to a corresponding remediation action module implemented for the specific cloud infrastructure.

Remediation engine 360 receives the formatted events, identifies the corresponding remediation actions specified in policy data 320 and applies the identified remediation actions to the customer clouds specific to the different cloud infrastructures. In one embodiment, remediation engine 360 is implemented to include one or more remediation actions modules, with each module identifying and applying remediation actions corresponding to a single cloud infrastructure.

Thus, policy server 150 facilitates customer/users to define the policies at a generic level, splits/converts the policies to cloud specific policies/actions automatically, listens to all the events happening across clouds/cloud infrastructures, matches the events with the policies to detect breaches, notifies the customer about the breaches, and applies remediation actions on the detected breaches. According to an aspect of the present disclosure, policy server 150 also helps the customer in defining policies for their clouds, as described in detail below.

Referring to FIG. 3B, remediation engine 360 is shown containing machine learning (ML) correlation engine 350, custom policies 372, preset policies 375, suggested policies 378 and policy definition helper 380. Each of the blocks of FIG. 3B is described in detail below.

Custom policies 372 represent the policies (maintained in policy data 320) that have been defined by customers specifically for their cloud infrastructures/environments. Preset policies 375 represents the policies that are pre-defined and accordingly stored as a part of policy data 320. For example, an administrator may define preset policies (such as those noted above) that are to be applied for all/different clouds in one or more cloud infrastructures. Suggested policies 378 represent policies that have been predicted by ML correlation engine 350.

ML correlation engine 350, provided according to an aspect of the present disclosure, generates a machine learning (ML) model based on policy data (320) specifying respective policies defined by customers in their corresponding clouds. ML correlation engine 350 then uses the ML model to predict a set of policies (suggested policies 378) of potential interest to a customer. The manner in which a set of policies is predicted based on an ML Model is described below with examples.

8. Predicting Policies Using Machine Learning Model

Figure 5:
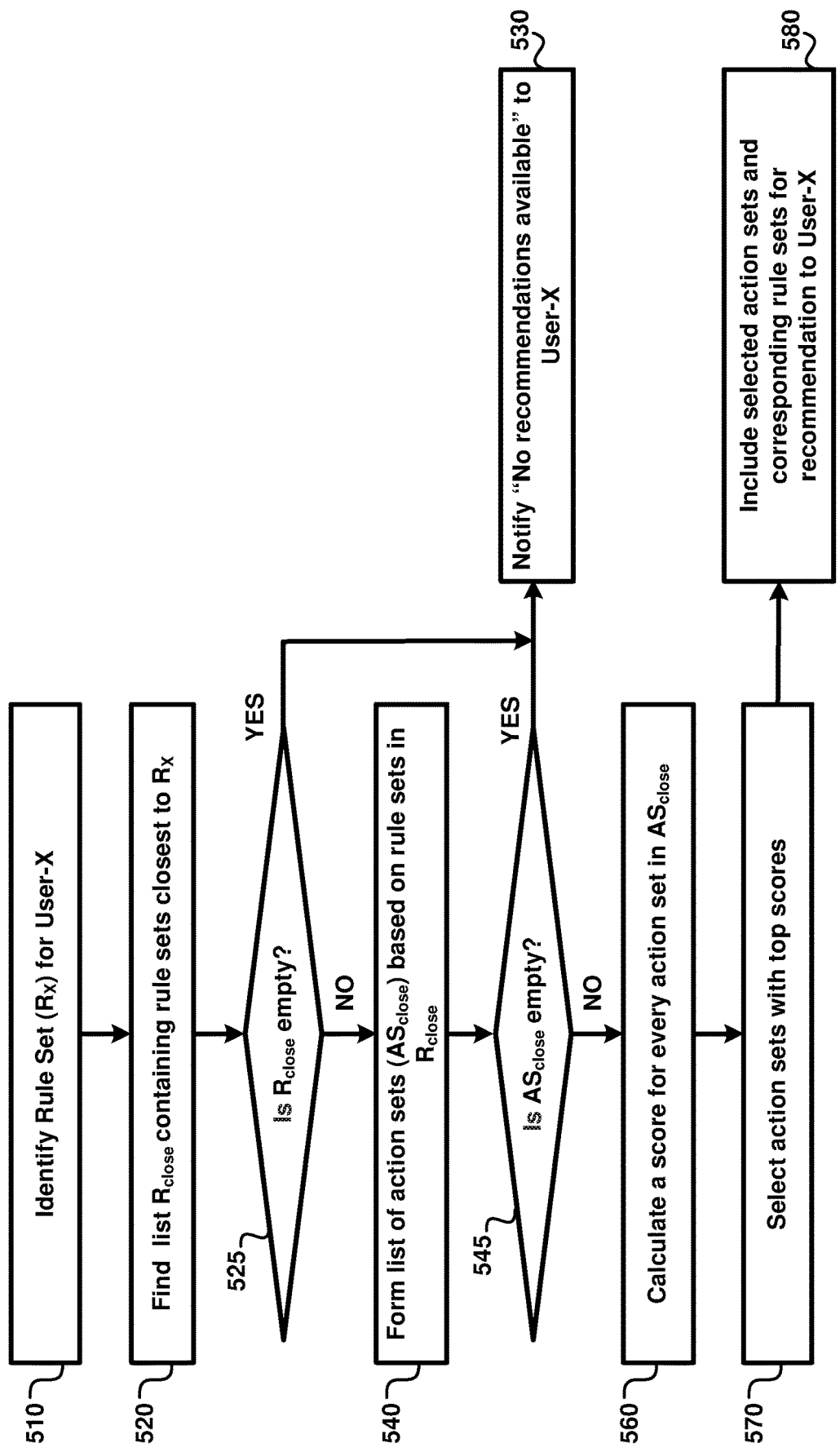
FIG. 5 is a flow chart illustrating the manner in which prediction of policies using a machine learning model is performed in one embodiment.

FIG. 5 is a flow chart illustrating the manner in which prediction of policies using a machine learning model is performed in one embodiment. The flowchart is described with respect to the systems of FIGS. 3A and 3B, in particular ML correlation engine 350, merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 501, in which control immediately passes to step 510.

In step 510, ML correlation engine 350 identifies an initial rule set ($R_x$) for a customer (User X). For example, the initial rule set may be received from the customer along with receiving the deployment details of the cloud (in step 230 of FIG. 2). According to an aspect of the present disclosure, ML correlation engine 350 performs auto-discovery of the initial rule set based on the deployment details of the cloud provided by the customer. For example, ML correlation engine 350 may select one or more of preset policies 375 based on the deployment details as the initial rule set. In the example noted with respect to FIG. 2, ML correlation engine 350 may include the ElastiCache policy in the initial set of policies if the the deployment details indicates that the customer is using AWS ElastiCache for a cluster.

In step 520, ML correlation engine 350 finds a list ($R_{close}$) containing a set of rule sets that are determined to be closest to $R_x$. In one embodiment, the list is found based on the ML model generated using the policy data. The ML model is accordingly implemented to support regression similarity learning. For general background on regression similarity learning, the reader is referred to the book entitled "Machine Learning in Action" by Peter Harrington, ISBN No. 9781617290183 and published on 2012.

As is well known, in regression similarity learning, the input to the ML model will be a learning set of pairs of rule sets ($R_i$, $R_j$) with a measure of their similarity $S_{ij}$. The similarity score may represent the similarity of the conditions specified in the rule sets, and may be based on the similarity of the field (e.g. tagValue), operator (e.g. !=) and value (e.g. 'public') specified in the conditions of the respective rule sets. In addition, logical operators (such as AND, OR) can be used to combine various expressions and form a unique expression. The similarity measure may also depend on the order of expressions in the rule set. In some expressions, a small change in the expression may indicate significant difference (e.g., 'isMachineShutDown=true' and 'isMachineShutDown=false' are very similar texts but have completely opposite meaning) and hence the similarity score should be very low. In contrast, 'numberOfTags>5' and 'numberOfTags>6' should have a very high degree of similarity even though the values (5 and 6) are different.

The similarly score matrix for pairs of rule sets ($R_i$, $R_j$) may be represented as:

| Rule set $R_i$ | Rule set $R_j$ | Similarity Score $S_{ij}$ |
| --- | --- | --- |
| $R^1$ | $R_2$ | $S_{12}$ |
| $R_2$ | $R_3$ | $S_{23}$ |
| ... | ... | ... |
| $R_n$ | $R_{n+1}$ | $S_{nn+1}$ |
| $R_x$ | ($R_1, \ldots, R_n$) | ? |

The goal for the ML model is to learn a similarity function that approximates equation (1) for every new labeled triplet ($R_i$, $R_j$, $S_{ij}$) from the provided input.

$$f(R_i, R_j) \sim S_{ij} \forall i,j \in (1,n) \quad \text{Equation (1)}$$

The loss function is shown below:

$$C = (S_i^{input} - S_i^{calculated})^2 \quad \text{Equation (2)}$$

Where
$S_i^{input}$ is the value available to the learning system (ML model) from the learning set; and
$S_i^{calculated}$ is the value calculated by the similarity function.

The similarity function is tuned using above loss function C. The key is to minimize the value of C for the best results possible. For example, the rule set shown in row 421 of table 410 should be scored higher in the learning dataset with all other rule sets for Object.Storage and even higher for rule sets related to object store Encryption. A good learning data set will result in better outcomes.

In step 525, ML correlation engine 350 checks whether $R_{close}$ is empty, that is, if there are no rule sets determined to be close to the initial rule set. Control passes to step 530 if $R_{close}$ is empty and to step 540 otherwise. In step 530, ML correlation engine 350 notifies "No recommendations available" to the customer (User X).

In step 540, ML correlation engine 350 forms a list of action sets ($AS_{close}$) based on rule sets in $R_{close}$. Specifically, the list is formed by including all of the actions sets specified corresponding to each rule set in $R_{close}$. In step 545, ML correlation engine 350 checks whether $AS_{close}$ is empty, that is, if there are no actions sets. Control passes to step 530 (where the user is notified of "No recommendations available") if $AS_{close}$ is empty and to step 560 otherwise.

In step 560, ML correlation engine 350 calculates a score for every action set in ASclose. In step 570, ML correlation engine 350 selects action sets with top scores. Broadly, each action set in $AS_{close}$ is scored depending on the number of occurrences of the action set across all of the rule sets in $R_{close}$ in conjunction with the $R_{close}$ closeness scores noted above.

In one embodiment, the calculation and selection is performed based on the ML model generated using the policy data. The ML model is accordingly implemented to user-based collaborative filtering, where the user corresponds to the rule set and item corresponds to the action set. For general background on user-based collaborative filtering, the reader is referred to the document entitled "Unifying User-based and Item-based Collaborative Filtering Approaches by Similarity Fusion" by Jun Wang, Arjen P. de Vries, Marcel J. T. Reinders; Information and Communication Theory Group; Faculty of Electrical Engineering, Mathematics and Computer Science, Delft University of Technology, The Netherlands, Published on Aug. 6-11, 2006.

As is well known, in collaborative filtering, the inputs to the ML model are (1) the similarity score matrix noted above and (2) a rating matrix. In the rating matrix, for each rule set, the actions that have been already created corresponding to this rule set gets 1, all others get 0 as rating. The rule set to action set rating matrix may be represented as:

| RuleSet $R_i$ | Action $A_1$ | Action | ... | Action | ... | Action $A_m$ |
|---|---|---|---|---|---|---|
| $R_1$ | 1 | 0 | ... | 0 | ... | 0 |
| $R_2$ | 0 | 0 | ... | 1 | ... | 0 |
| $R_i$ | ... | | | | | ... |
| $R_n$ | 1 | 1 | ... | 0 | ... | 1 |
| $R_x$ | ? | ? | ? | ? | ? | ? |

The goal for the ML model is to compute the missing ratings for any rule set $R_x$ provided it's similarity with all other rule sets in the system are available. Thus, for each rule set-action pair (i, j), the missing rating $X_{ij}$ is computed as:

$$X_{ij} \sim \frac{(\Sigma S_{ik} X_{kj})}{(\Sigma S_{ik})} \forall k \in (1, n) \quad \text{Equation (3)}$$

Where $S_{ik}$ is the similarity score between rule sets $R_i$ and $R_k$; and
$X_{kj}$ is the rating for Action $A_j$ for rule set $R_k$ For example, the policy shown in row 421 of table 410 indicates the Actions 'Set Encryption' and 'Notify by Email' for the rule set of Object.Storage with no Encryption. In learning dataset it is probable that the Action 'Set Encryption' is available for almost all the occurrences of a similar rule set, but the Action 'Notify by Email' may not be true for all cases, instead it may be 'Notify by Slack' or 'Create ticket'. Hence for this rule set, action 'Set Encryption' will be recommended with a higher rating. In alternative embodiment, the action sets may be broken into individual actions and above noted collaborative filtering may be implemented with respect to individual actions.

In step 580, ML correlation engine 350 includes selected action sets and corresponding rule sets for recommendation to the customer (User X). In particular, ML correlation engine 350 includes the selected policies in suggested policies 378. The flow chart ends in step 599.

Thus, ML correlation engine 350 predicts a set of policies (suggested policies 378) of potential interest to a customer. Referring again to FIG. 3B, policy definition helper 380 assists the customer in defining policies for their clouds. In particular, policy definition helper 380 provides various policies (chosen from custom policies 372 and preset policies 375) and also suggested policies 378 to policy definition engine 310 (via path 316), which in turn displays the provided policies (as recommendations) in the user interface provided to the customer for defining policies for his/her cloud. The customer is accordingly facilitated to select the desired ones of the recommended policies for definition in their cloud.

Thus, policy server 150 predicts and recommends policies of interest to the customers and accordingly simplifies the task of customers in defining policies for their clouds.

It should be appreciated that the features described above can be implemented in various embodiments as a desired combination of one or more of hardware, software, and firmware. The description is continued with respect to an embodiment in which various features are operative when the software instructions described above are executed.

9. Digital Processing System

Figure 6:
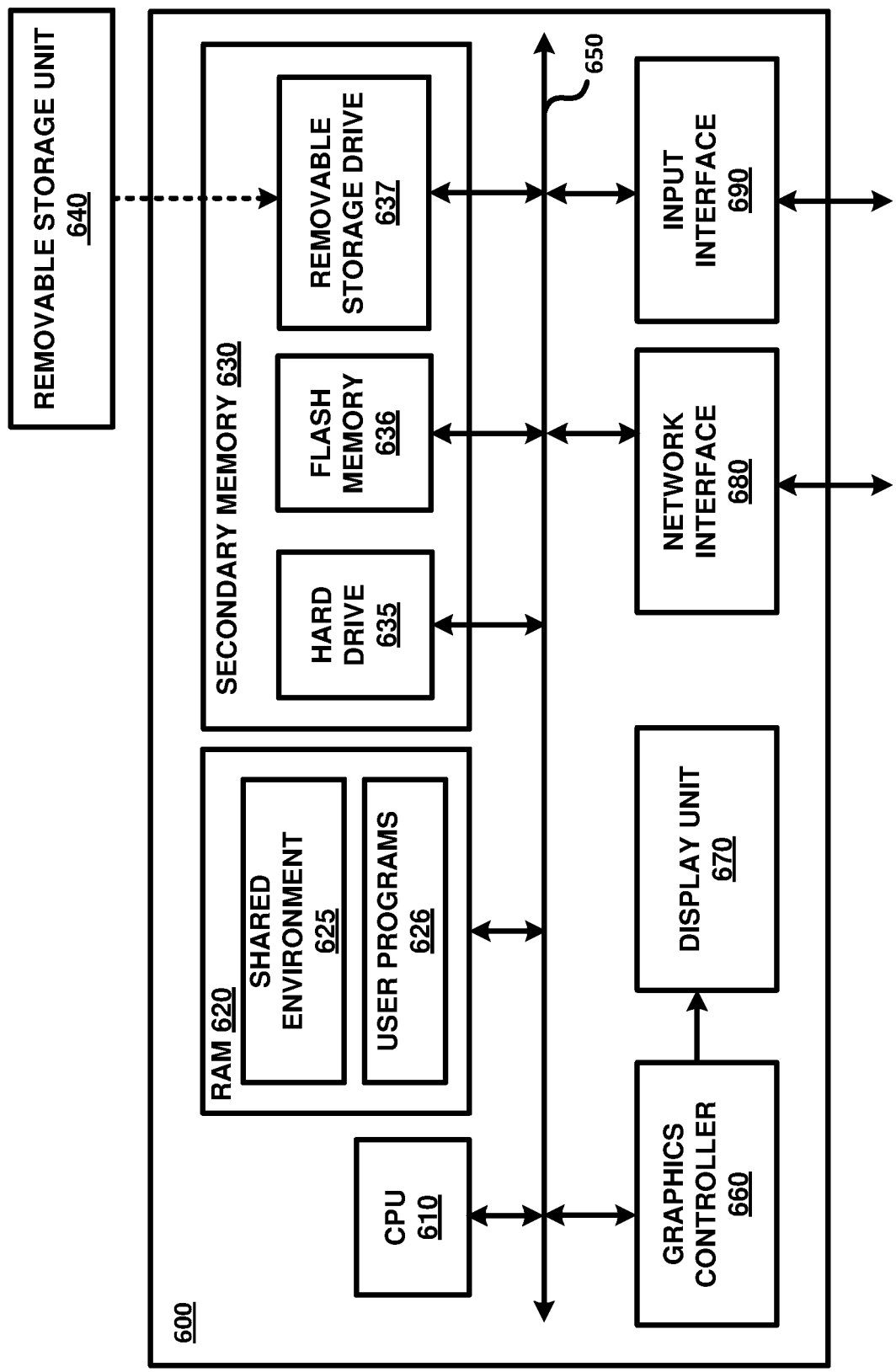
FIG. 6 is a block diagram illustrating the details of a digital processing system in which various aspects of the present disclosure are operative by execution of appropriate executable modules.

FIG. 6 is a block diagram illustrating the details of digital processing system 600 in which various aspects of the present disclosure are operative by execution of appropriate executable modules. Digital processing system 600 may correspond to policy server 150.

Digital processing system 600 may contain one or more processors such as a central processing unit (CPU) 610, random access memory (RAM) 620, secondary memory 630, graphics controller 660, display unit 670, network interface 680, and input interface 690. All the components except display unit 670 may communicate with each other over communication path 650, which may contain several buses as is well known in the relevant arts. The components of FIG. 6 are described below in further detail.

CPU 610 may execute instructions stored in RAM 620 to provide several features of the present disclosure. CPU 610 may contain multiple processing units, with each processing unit potentially being designed for a specific task. Alternatively, CPU 610 may contain only a single general-purpose processing unit.

RAM 620 may receive instructions from secondary memory 630 using communication path 650. RAM 620 is shown currently containing software instructions constituting shared environment 625 and/or other user programs 626 (such as other applications, DBMS, etc.). In addition to shared environment 625, RAM 620 may contain other software programs such as device drivers, virtual machines, etc., which provide a (common) run time environment for execution of other/user programs.

Graphics controller 660 generates display signals (e.g., in RGB format) to display unit 670 based on data/instructions received from CPU 610. Display unit 670 contains a display screen to display the images specified by the display signals. Input interface 690 may correspond to a keyboard and a pointing device (e.g., touch-pad, mouse) and may be used to provide inputs. Network interface 680 provides connectivity to a network (e.g., using Internet Protocol), and may be used to communicate with other systems (of FIG. 1) connected to the networks (120).

Secondary memory 630 may contain hard drive 635, flash memory 636, and removable storage drive 637. Secondary memory 630 may store the data (for example, data portions shown in FIGS. 4A-4C) and software instructions (for example, for implementing the various features of the present disclosure shown in FIGS. 2 and 5), which enable digital processing system 600 to provide several features in accordance with the present disclosure. The code/instructions stored in secondary memory 630 may either be copied to RAM 620 prior to execution by CPU 610 for higher execution speeds, or may be directly executed by CPU 610.

Some or all of the data and instructions may be provided on removable storage unit 640, and the data and instructions may be read and provided by removable storage drive 637 to CPU 610. Removable storage unit 640 may be implemented using medium and storage format compatible with removable storage drive 637 such that removable storage drive 637 can read the data and instructions. Thus, removable storage unit 640 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 640 or hard disk installed in hard drive 635. These computer program products are means for providing software to digital processing system 600. CPU 610 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 630. Volatile media includes dynamic memory, such as RAM 620. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 650. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

10. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

What is claimed is:

1. A method comprising:
maintaining a policy data specifying respective one or more policies defined by a plurality of respective customers in their corresponding clouds, wherein each cloud is constituted of software components and data services, wherein applications are hosted based on said software components and said data services for processing user requests in the corresponding cloud,
wherein a policy defined for a corresponding cloud specifies a respective constraint to be enforced on said software components and said data services hosted in said corresponding cloud in a duration said applications hosted on said software components process user requests,
wherein the corresponding constraint specifies a respective pair of a condition and an action, wherein the condition is specified with respect to at least one of said software components and said data services, wherein the action is to be performed in said corresponding cloud when said condition is satisfied during operation of said corresponding cloud after said corresponding cloud is provisioned and configured;
receiving deployment details of a first cloud of a first customer, said deployment details comprising details of software components and data services hosted in said first cloud;
determining a set of one or more policies of potential interest to said first customer from said respective one or more policies specified in said policy data based on said deployment details of said first cloud, wherein said set of one or more policies of potential interest comprises an initial set of policies of said respective one or more policies based on said deployment details, and additional policies of said respective one or more policies that are similar to policies in said initial set; and
recommending said set of one or more policies of potential interest for said first customer for applying in said first cloud,
wherein said determining and said recommending are based on the policy data specifying respective one or more policies defined by the plurality of respective customers in their corresponding clouds.

2. The method of claim 1, wherein said software components comprise virtual machines, wherein said deployment details further comprise hardware components constituting said first cloud, wherein each of said respective one or more policies are enforced only after said applications are operative to process respective user requests in the corresponding cloud,
said method further comprising generating a machine learning (ML) model based on said policy data,
wherein said determining comprises predicting said set of one or more policies of potential interest based on said ML model.

3. The method of claim 2, wherein each policy is of the form of a rule set and a corresponding action set, wherein said rule set specifies said condition and said corresponding action set specifies said action,
wherein similarity of an additional policy to a specific policy in said initial set is determined based on similarity of said rule set of said additional policy to said rule set of said specific policy.

4. The method of claim 3, wherein said predicting comprises:
identifying an initial rule set for the customer based on software components specified in said deployment details;
finding, based on said ML model, a set of rule sets closest in similarity to the initial rule set;
forming a set of action sets comprising the corresponding action set of each of said set of rule sets;
selecting, based on said ML model, a subset of action sets that are most suitable for said initial rule set; and including each of said subset of action sets and the corresponding rule set as a corresponding policy in said set of one or more policies of potential interest.

5. The method of claim 1, wherein said respective one or more policies maintained in said policy data comprise corresponding constraints directed to one or more of network security, compliance and cloud governance.

6. The method of claim 4, further comprising calculating a score for each action set in said set of actions sets,
wherein said selecting selects said subset of actions sets based on said score.

7. The method of claim 6, wherein said finding is performed using regression similarity learning in said ML model, wherein said selecting is performed using collaborative filtering in said ML model.

8. A non-transitory machine readable medium storing one or more sequences of instructions, wherein execution of said one or more instructions by one or more processors contained in a digital processing system causes said digital processing system to perform the actions of:
maintaining a policy data specifying respective one or more policies defined by a plurality of respective customers in their corresponding clouds, wherein each cloud is constituted of software components and data services, wherein applications are hosted based on said software components and said data services for processing user requests in the corresponding cloud,
wherein a policy defined for a corresponding cloud specifies a respective constraint to be enforced on said software components and said data services hosted in said corresponding cloud in a duration said applications hosted on said software components process user requests,
wherein the corresponding constraint specifies a respective pair of a condition and an action, on said software components and said data services hosted in said corresponding cloud in a duration said applications hosted on said software components process user requests, wherein the action is to be performed in said corresponding cloud when said condition is satisfied during operation of said corresponding cloud after said corresponding cloud is provisioned and configured;
receiving deployment details of a first cloud of a first customer, said deployment details comprising details of software components and data services hosted in said first cloud;
determining a set of one or more policies of potential interest to said first customer from said respective one or more policies specified in said policy data based on said deployment details of said first cloud, wherein said set of one or more policies of potential interest comprises an initial set of policies of said respective one or more policies based on said deployment details, and additional policies of said respective one or more policies that are similar to policies in said initial set; and
recommending said set of one or more policies of potential interest for said first customer for applying in said first cloud,
wherein said determining and said recommending are based on the policy data specifying respective one or more policies defined by the plurality of respective customers in their corresponding clouds.

9. The non-transitory machine readable medium of claim 8, wherein said software components comprise virtual machines, wherein said deployment details further comprise hardware components constituting said first cloud, wherein each of said respective one or more policies are enforced only after said applications are operative to process respective user requests in the corresponding cloud,
said actions further comprising one or more instructions for generating a machine learning (ML) model based on said policy data,
wherein said determining comprises one or more instructions for predicting said set of one or more policies of potential interest based on said ML model.

10. The non-transitory machine readable medium of claim 9, wherein each policy is of the form of a rule set and a corresponding action set, wherein said rule set specifies said condition and said corresponding action set specifies said action,
wherein similarity of an additional policy to a specific policy in said initial set is determined based on similarity of said rule set of said additional policy to said rule set of said specific policy.

11. The non-transitory machine readable medium of claim 10, wherein said predicting comprises one or more instructions for:
identifying an initial rule set for the customer based on software components specified in said deployment details;
finding, based on said ML model, a set of rule sets closest in similarity to the initial rule set;
forming a set of action sets comprising the corresponding action set of each of said set of rule sets;
selecting, based on said ML model, a subset of action sets that are most suitable for said initial rule set; and
including each of said subset of action sets and the corresponding rule set as a corresponding policy in said set of one or more policies of potential interest.

12. The non-transitory machine readable medium of claim 8, wherein said respective one or more policies maintained in said policy data comprise corresponding constraints directed to one or more of network security, compliance and cloud governance.

13. The non-transitory machine readable medium of claim 11, further comprising one or more instructions for calculating a score for each action set in said set of actions sets, wherein said selecting selects said subset of actions sets based on said score.

14. The non-transitory machine readable medium of claim 13, wherein said finding is performed using regression similarity learning in said ML model, wherein said selecting is performed using collaborative filtering in said ML model.

15. A digital processing system comprising:
a random access memory (RAM) to store instructions; and
one or more processors to retrieve and execute said instructions, wherein execution of said instructions causes said digital processing system to perform the actions of:
maintaining a policy data specifying respective one or more policies defined by a plurality of respective customers in their corresponding clouds, wherein each cloud constituted of software components and data services, wherein applications are hosted based on said software components and said data services for processing user requests in the corresponding cloud,
wherein a policy defined for a corresponding cloud specifies a respective constraint to be enforced on said software components and said data services hosted in said corresponding cloud in a duration said applications hosted on said software components process user requests, wherein the corresponding constraint specifies a respective pair of a condition and an action, wherein the condition is specified with respect to at least one of said software components and said data services, wherein the action is to be performed in said corresponding cloud when said condition is satisfied during operation of said corresponding cloud after said corresponding cloud is provisioned and configured;

receiving deployment details of a first cloud of a first customer, said deployment details comprising details of software components and data services hosted in said first cloud;

determining a set of one or more policies of potential interest to said first customer from said respective one or more policies specified in said policy data based on said deployment details of said first cloud, wherein said set of one or more policies of potential interest comprises an initial set of policies of said respective one or more policies based on said deployment details, and additional policies of said respective one or more policies that are similar to policies in said initial set; and recommending said set of one or more policies of potential interest for said first customer for applying in said first cloud, wherein said determining and said recommending are based on the policy data specifying respective one or more policies defined by the plurality of respective customers in their corresponding clouds.

16. The digital processing system of claim 15, wherein said software components comprise virtual machines, wherein said deployment details further comprise hardware components constituting said first cloud, wherein each of said respective one or more policies are enforced only after said applications are operative to process respective user requests in the corresponding cloud, said actions further performing the actions of generating a machine learning (ML) model based on said policy data, wherein for said determining, said digital processing system performs the actions of predicting said set of one or more policies of potential interest based on said ML model.

17. The digital processing system of claim 16, wherein each policy is of the form of a rule set and a corresponding action set, wherein said rule set specifies said condition and said corresponding action set specifies said action, wherein similarity of an additional policy to a specific policy in said initial set is determined based on similarity of said rule set of said additional policy to said rule set of said specific policy.

18. The digital processing system of claim 17, wherein for said predicting, said digital processing system performs the actions of:

identifying an initial rule set for the customer based on software components specified in said deployment details;

finding, based on said ML model, a set of rule sets closest in similarity to the initial rule set;

forming a set of action sets comprising the corresponding action set of each of said set of rule sets;

selecting, based on said ML model, a subset of action sets that are most suitable for said initial rule set; and including each of said subset of action sets and the corresponding rule set as a corresponding policy in said set of one or more policies of potential interest.

19. The digital processing system of claim 18, further performs the actions of calculating a score for each action set in said set of actions sets, wherein said digital processing system selects said subset of actions sets based on said score.

20. The digital processing system of claim 19, wherein said finding is performed using regression similarity learning in said ML model, wherein said selecting is performed using collaborative filtering in said ML model.

21. The digital processing system of claim 15, wherein said respective one or more policies maintained in said policy data comprise corresponding constraints directed to one or more of network security, compliance and cloud governance.

* * * * *